United States Patent
Guenthner et al.

(10) Patent No.: US 6,360,262 B1
(45) Date of Patent: Mar. 19, 2002

(54) MAPPING WEB SERVER OBJECTS TO TCP/IP PORTS

(75) Inventors: Timothy John Guenthner; Francis D. Lawlor; Dah-Haur Lin; Charles Rudolph Schmitt, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/977,636

(22) Filed: Nov. 24, 1997

(51) Int. Cl.[7] ............................................... G06F 13/14
(52) U.S. Cl. ...................... 709/226; 709/223; 709/224; 709/219; 709/203; 709/250
(58) Field of Search ................................. 709/200, 105, 709/104, 226, 223, 238, 203, 219, 224, 246, 245, 250; 370/389, 401

(56) References Cited

U.S. PATENT DOCUMENTS

| | | | | |
|---|---|---|---|---|
| 5,371,852 A | * | 12/1994 | Attanasio et al. | 709/245 |
| 5,636,371 A | * | 6/1997 | Yu | 395/500 |
| 5,734,865 A | * | 3/1998 | Yu | 395/500 |
| 5,751,952 A | * | 5/1998 | Dai et al. | 709/250 |
| 5,751,961 A | * | 5/1998 | Smyk | 709/217 |
| 5,761,507 A | * | 6/1998 | Govett | 709/304 |
| 5,774,660 A | * | 6/1998 | Brendel et al. | 709/201 |
| 5,802,278 A | * | 9/1998 | Isfeld et al. | 709/249 |
| 5,828,835 A | * | 10/1998 | Isfeld et al. | 709/200 |
| 5,856,974 A | * | 1/1999 | Gervais et al. | 370/392 |
| 5,859,978 A | * | 1/1999 | Sounderegger et al. | 709/226 |
| 5,862,348 A | * | 1/1999 | Pedersen | 709/229 |
| 5,870,546 A | * | 2/1999 | Kirch | 709/203 |
| 6,006,266 A | * | 12/1999 | Murphy, Jr. et al. | 709/227 |
| 6,061,349 A | * | 5/2000 | Coile et al. | 370/389 |
| 6,070,191 A | * | 5/2000 | Narendaran et al. | 709/226 |

FOREIGN PATENT DOCUMENTS

| | | |
|---|---|---|
| CA | 2202572 | 10/1998 |
| EP | 865180 A2 | 9/1988 |
| WO | 9734244 | 9/1997 |

OTHER PUBLICATIONS

W. Richard Stevens, TCP/IP Illustrated vol. 1, pp. 12–13 and 465–467, 1994.*

* cited by examiner

Primary Examiner—Glenton B. Burgess
Assistant Examiner—Abdullahi E. Salad
(74) Attorney, Agent, or Firm—Jeffrey S. LaBaw; Joseph R. Burwell; David Judson (57) ABSTRACT

A method of routing in a computer network having a pool of servers capable of servicing requests for access to a set of server resource objects. The set of server resource objects are distributed in a non-homogeneous manner across the server pool. According to the method, each incoming client request for access to a specified server resource object is targeted to a router having an associated port space identifying a plurality of ports. Based on the port on which an incoming client request is received, the request is mapped to one of the server resource objects. The router then selects the "best provider" and redirects or forwards the request to that server. The routing and redirection is based upon the port for the incoming request.

43 Claims, 7 Drawing Sheets

MAPPING WEB SERVER OBJECTS TO TCP/IP PORTS

BACKGROUND OF THE INVENTION

1. Technical Field

The present invention relates generally to communications within a client-server computer network and, in particular, to a method of routing client requests to specified server objects using a server resource-to-IP port mapping scheme.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML).

It is known in the art to collect multiple servers in a "pool" so that the servers may be managed collectively. All of the servers may have a common Uniform Resource Locator (URL) from the perspective of a client machine running a browser. These servers typically support many different types of server objects (e.g., databases, CGI scripts, active server page (.asp) scripts, and the like) that are desired to be accessed by the client machines.

The set of servers in the pool get HTTP requests from Web browser clients, and these requests reference server resources (e.g., one or more databases supported on or across those servers). It is desired to route these HTTP requests to the appropriate server in the server pool and to maintain balanced loads across the servers. Not all servers in the cluster, however, are equal (i.e. they are not homogeneous, with respect to their server resource objects). For example, the requested database may reside on one or more than one server, but not necessarily on all servers.

To route the request, the name of the requested database, which is part of the HTTP packet, must be known. This name is commonly extracted by parsing the HTTP request in a two-step process. In particular, the received TCP/IP packets (that include the HTTP request) are first parsed or "opened up" by TCP/IP services to determine the application that will process the request. The request is then passed to the application to be further processed, i.e. to determine the requested object. These processing requirements have a negative impact on the overall performance of servicing the client request.

It would be advantageous to be able to determine the name of the server resource without having to parse the TCP/IP packet, and then parse (and possibly decrypt) the HTTP packet.

The present invention addresses this problem.

BRIEF SUMMARY OF THE INVENTION

The object of this invention is a means and method for mapping server resource objects to the servers that provide access to these resource objects, preferably using a set of TCP/IP port numbers. Through dynamically generated HTML, Web pages are delivered to Web clients. These Web pages contain anchors for these server resource objects. The underlying anchors are preferably of the form:

http://<server name>:<port>/<server resource> where <server name> maps to the IP address for a Resource Router and the port maps to the requested server resource.

The Resource Router listens for TCP/IP requests coming in on the port set that map the server objects. When a request arrives at a port, the Resource Router fields the request, selects the "best provider" and redirects or forwards the request to that server. The routing and redirection is based upon the port for the incoming request.

The Resource Router maintains a mapping of server objects to TCP/IP ports in the port space for the IP address under which is operates. This mapping is a table with a row for each server object. Preferably, the contents of the row are a port number, a server object, and a list of servers which are capable of serving the requested object. The list of servers is preferably ordered, based on a pre-specified criteria, so that the server best matching the specified criteria receives the request. The request is either forwarded to the server by the Resource Router, or a redirection response specifying the server is returned to the client, which in turn, redirects the response to the server.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
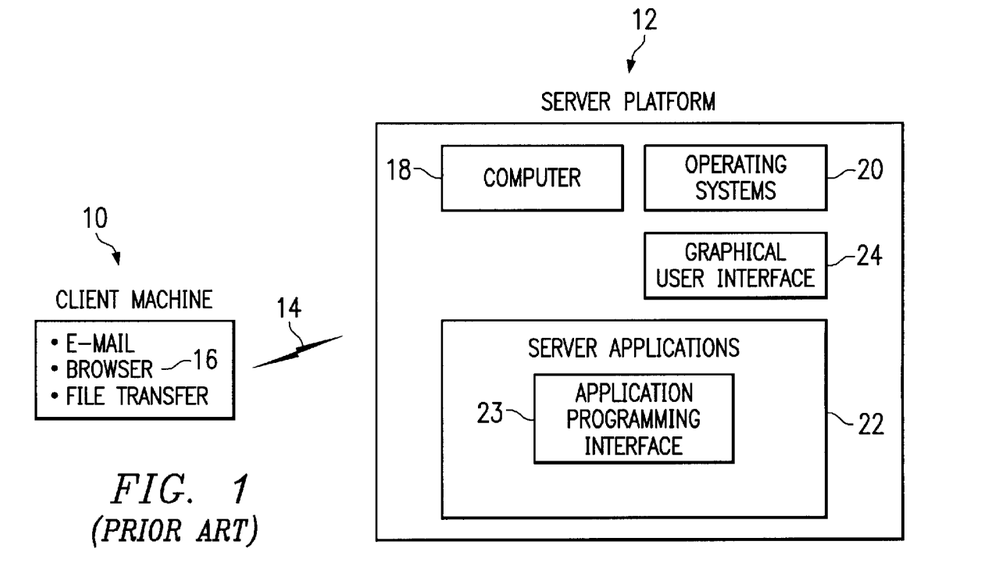
FIG. 1 is a representative client-server computer system of the Prior Art.
Figure 2:
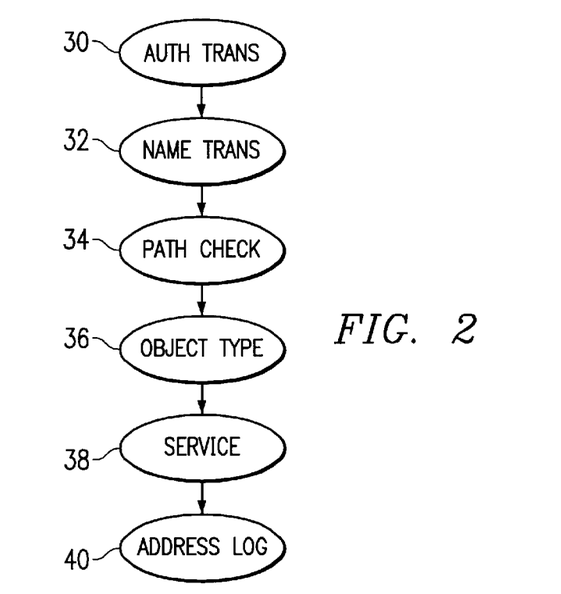
FIG. 2 is a flowchart illustrating the conventional server processing associated with an HTTP request from the Web client to the Web server shown in FIG. 1.

FIGS. 1–2 are provided by way of background. A representative client-server network system is illustrated in FIG 1. A client machine 10 is connected to a Web server platform 12 via network 14. For illustrative purposes, network 14 is the Internet, an Intranet or other known network connection. Web server platform 12 is one of a plurality of servers which are accessible by clients, one of which is illustrated by machine 10. A representative client machine includes a browser 16, which is a known software tool used to access the servers of the network. The Web server platform supports files (collectively referred to as a "Web" site) in the form of hypertext documents and objects. In the Internet paradigm, a network path to a server is identified by a so-called Uniform Resource Locator (URL).

A representative Web Server platform 12 comprises an IBM RISC System/6000 computer 18 (a reduced instruction set of so-called RISC-based workstation) running the AIX® (Advanced Interactive Executive Version 4.1 and above) Operating System 20 and a Web server program 22, such as Netscape Enterprise Server Version 2.0, that supports interface extensions. The platform 12 also includes a graphical user interface (GUI) 24 for management and administration. The Web server 18 also includes an Application Programming Interface (API) 23 that provides extensions to enable application developers to extend and/or customize the core functionality thereof through software programs commonly referred to as "plug-ins."

A representative Web client is a personal computer that is X86-, PowerPC®- or RISC-based, that includes an operating system such as IBM® OS/2® or Microsoft Windows 95, and that includes a browser, such as Netscape Navigator 3.0 (or higher), having a Java Virtual Machine (JVM) and support for application plug-ins and helper applications.

As is well-known, the Web server accepts a client request and returns a response. The operation of the server program 22 is governed by a number of server application functions (SAFs), each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL (a so-called "HTTP 301 Response") or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client. This function can run the normal server service routine (to return a file), some other server function (such as a program to return a custom document) or a CGI program. At step 40, called Add Log (AddLog), information about the transaction is recorded.

Figure 3:
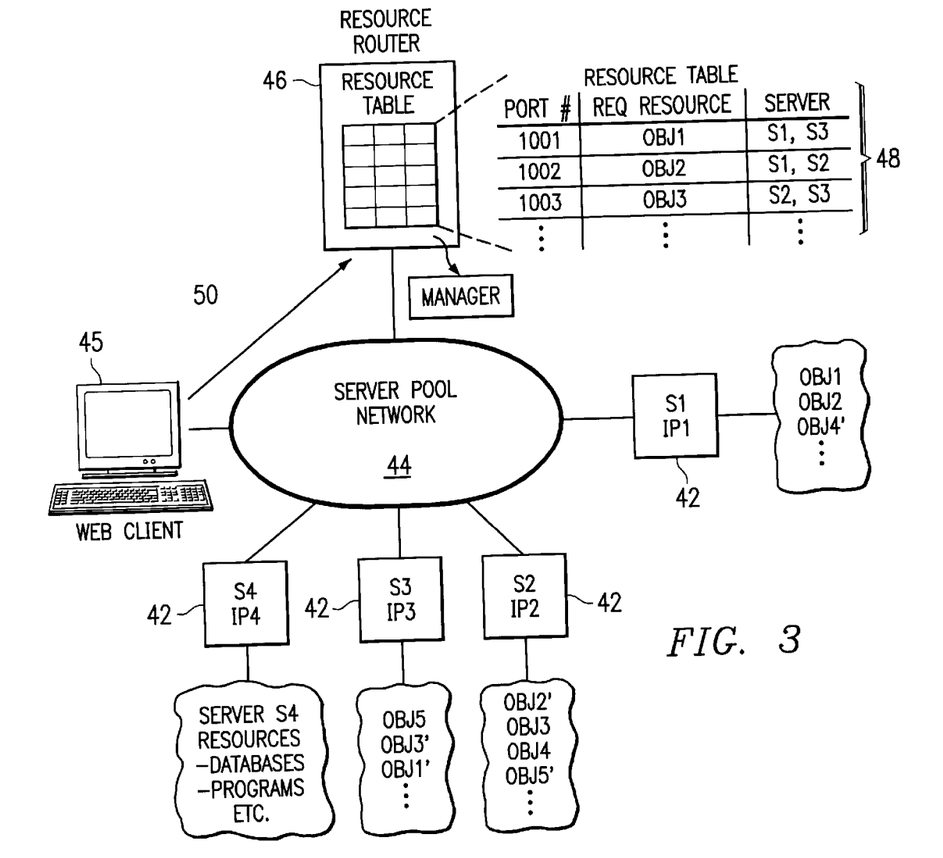
FIG. 3 is an illustrative network environment in which the present invention is implemented.

FIG. 3 is a block diagram of a representative computer system in which the present invention is implemented. In this system, there is a pool of servers 42 (identified as S1–S4) capable of servicing requests for access to server resource objects (e.g., OBJ1, OBJ2, etc.) received over a server pool network 44 from a Web client 45. In the system, there is a set of server resource objects distributed in a non-homogeneous manner across the server pool. For some objects (e.g., OBJ1), there may be multiple servers (namely, S1 and S3) which are capable of providing the requested resource. A replicated object is thus illustrated with a prime (e.g., OBJ1 and OBJ1'). For these servers which replicated objects, there may be a non-equal cost associated with accessing the object on one server as opposed to another. The server which has the lowest cost associated with accessing a requested server object is considered the "best provider" for that request. Any convenient mechanism for choosing the "best provider" may be used.

According to the invention, a facility 46, called a Resource Router, is provided and is made the target of all incoming client requests for new access to a specified server resource object. The Resource Router 46 is capable of routing and directing client requests to the "best provider" or most appropriate server, based on the object of the request. An encoding or mapping scheme is used to map the requested object to a TCP/IP port number in the port space of the Resource Router 46. This mapping is a resource table 48 with a row for each server object. The contents of the row are a port number, a server object, and a list of servers that are capable of servicing the requested object. The list of servers is preferably ordered, based on a pre-specified criteria, so that the server best matching the specified criteria receives the request. Resource Router preferably contains a mechanism 50 for managing the port space so that as server objects are changed (in particular, if server objects are deleted), the port is marked as "inactive", representing an invalid request. Alternately, the port is reclaimed and mapped to another server object.

According to the invention, the request is either forwarded to the server by the resource router, or a redirection response specifying the server is returned to the client which, in turn, redirects the response to the server. Thus, routing and redirecting of a client request is achieved at the Resource Router 46 by maintaining the mapping of server objects (resource objects in the server pool) to TCP/IP ports at the resource router and selecting the "best server" based on the port on which the client request is received.

According to the invention, there are preferably two (2) ways of exploiting the inventive concept whereby server objects are mapped to TCP/IP ports for routing and redirection purposes. One is a basic method, which is accomplished at the IP level of the protocol. The second method is used for higher level, redirectable IP-based protocols including, without limitation, HTTP. Each of these methods is described below.

Routing with non-redirectable protocols at the IP level

Figure 4A:
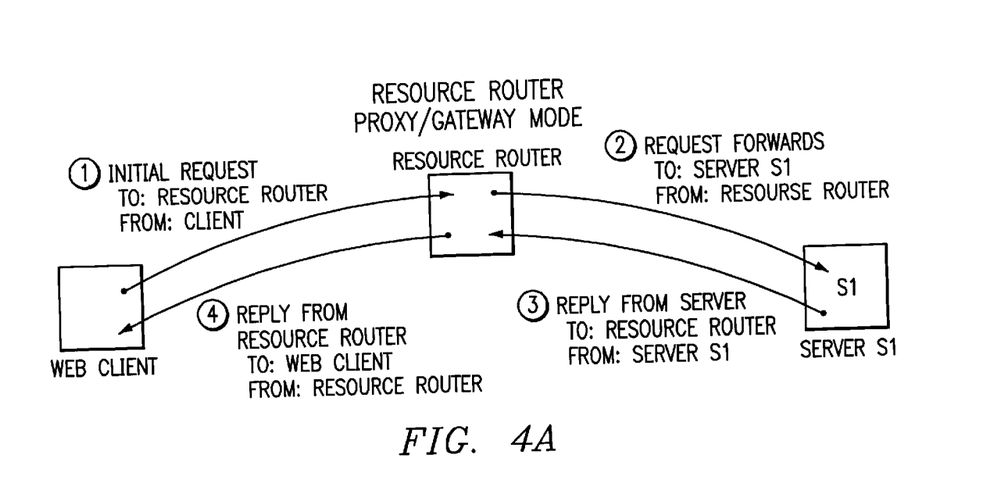
FIGS. 4A and 4B illustrate a first method of the present invention wherein the Resource Router is used to provide resource routing with non-redirectable protocols at the IP level.
Figure 4B:
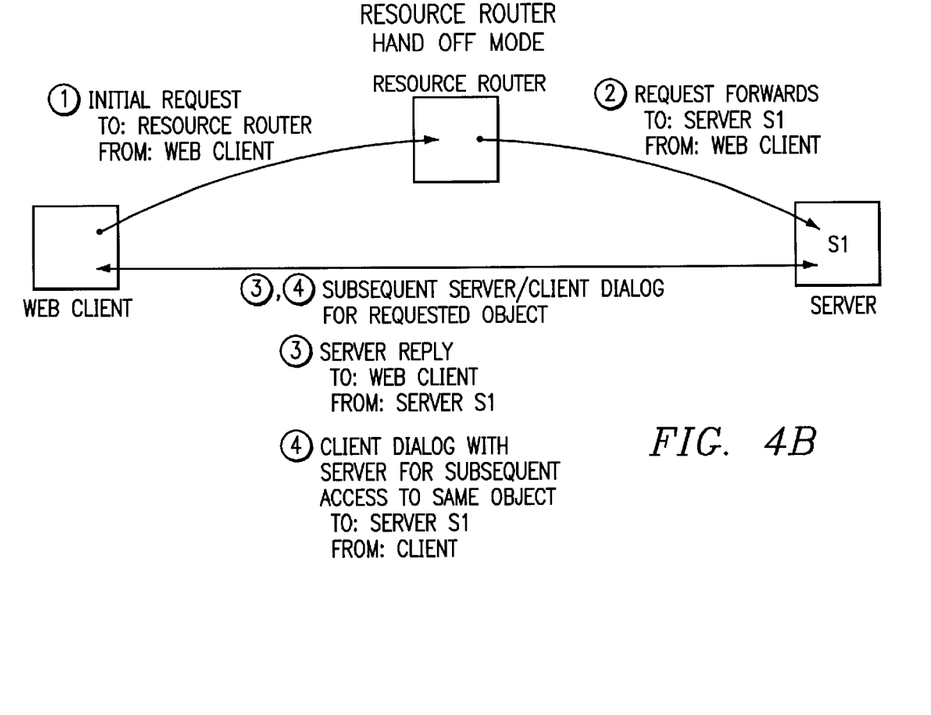

The first method, redirection at the IP level, is illustrated in FIGS. 4A–4B. In this method, the Resource Router 46 can operate in one of two manners: proxy/gateway or "handoff". In the first manner, illustrated in FIG. 4A, the Resource Router 46 is running in a gateway or proxy mode. In particular, in this mode, the Resource Router appears to the client to be the endpoint target of the request, and it appears to the server as the endpoint originator of the request. As illustrated in FIG. 4A, all requests flow from the Web client to the Resource Router. The Resource Router stores the client's address to formulate a reply and forwards the request to the server on behalf of the client. This forwarded request contains the Resource Router's address in a "from" field. The server responds to the Resource Router by addressing its reply to the address in the "from" field (requests and replies are typically routed at the server by turning around the "from" and "to" fields to respond to the requester). The Resource Router forwards the server response to the client by using the address it saved on the incoming initial request. All communications flow through the Resource Router.

In the second manner of operation, illustrated in FIG. 4B, the Resource Router is operating in the "handoff" mode. The initial request from the client targets the Resource Router. The Resource Router selects the most appropriate server and forwards the initial request to the server, however, the Resource Router forwards the request in a manner which leaves the "from" field set to the requesting client. The server sends its response directly back to the client, again by turning the request around and targeting the address it received in the "from" field. The Resource Router is not involved in the client/server dialog again until the client switches server objects and sends a request for an initial access to a new or different server object. This initial request for access to a new object is again directed to the Resource Router. The Resource Router again "hands off" the request to the best server.

Figure 5:
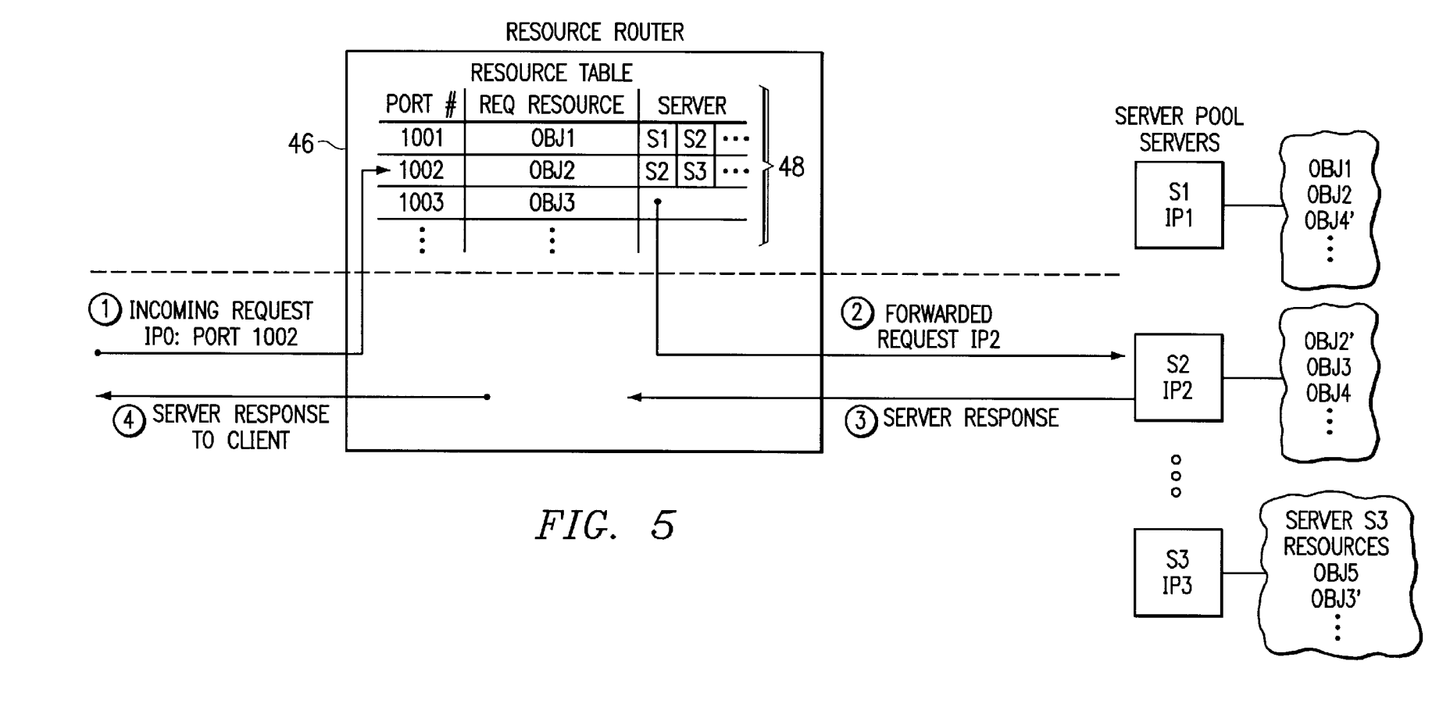
FIG. 5 illustrates the Resource Router mapping table used to provide resource routing with non-redirectable protocols at the IP level.

For non-redirectable protocols, as illustrated in FIG. 5, when the Resource Router 46 is operating in a gateway/proxy mode or a handoff mode, all initial requests flow through the Resource Router. Server selection is based solely on the TCP/IP port on which the incoming request was delivered. In particular, incoming requests are targeted to the Resource Router, which is listening on the port set. Based on the port on which the incoming request is received, the "best" provider for the requested resource is selected. The resource or "mapping" table 48 is used for this purpose. This port specification is part of the outer layer of the IP packet. Further parsing of the incoming IP packet thus is not required. If the incoming IP packet is encrypted, it is not necessary for the Resource Router to decrypt the packet. The packet is simply forwarded by the Resource Router to the "best" server. This routing and redirection is thus accomplished by processing at the IP level of the protocol. This can save considerable processing overhead at the Resource Router while determining the most appropriate server to be the target of the forwarded request.

If the Resource Router is running in a gateway/proxy or handoff mode, and encrypted requests are being submitted by the client, it is not necessary for the Resource Router to decrypt the incoming request to select a server for the object. The encrypted part of the packet is forwarded to the server. Similarly, if encrypted responses are flowing from the server through the Resource Router to the client, it is not necessary for the Resource Router to decrypt the response packet. The response packet is simply forwarded to the client. For the encrypted response in handoff mode, the Resource Router is not in the reply path. This can save considerable processing overhead in handling the request at the Resource Router.

Routing with redirectable higher level IP protocols

Figure 6:
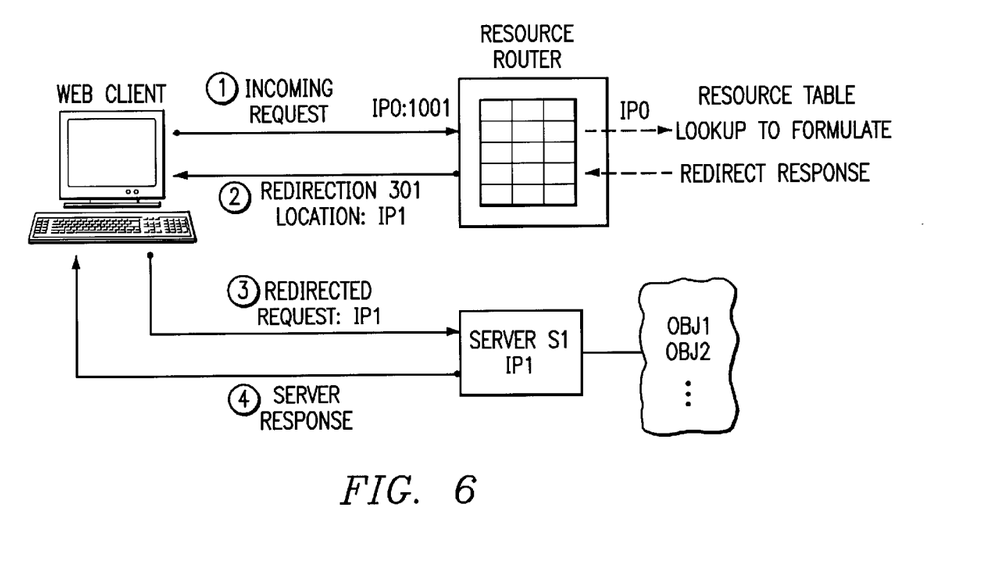
FIG. 6 illustrates a second method of the present invention wherein the Resource Router is used to provide resource routing with a redirectable protocol such as HTTP.

FIG. 6 illustrates resource routing with redirectable protocols according to the teachings of the present invention. In this illustrative example, it is assumed that a "primed" Web page has been delivered to the Web client. The Web page contains anchors that reference server objects for a pool of servers, all of which are interconnected on a network and are capable of communicating with each other and the Resource Router (as previously described). The anchors on the "primed" Web page are preferably of the form:

<servername>:<portNumber>, where <servername> is the IP address for the Resource Router 46 and <portNumber> is a TCP/IP port number in the port space at the Resource Router. Thus, because the "primed" Web page specifies URLs with the form:

http://<servername>:<port>/<database or file name>, a corresponding IP packet header is automatically generated by the standard TCP/IP protocol handler with the form:

<IP address:port>|<headers>|<HTTP PACKET>|<trailers>|.

When a user at the Web client selects one of the anchors, the following processing occurs as illustrated in FIG. 6.

The initial request for the server object flows to the Resource Router, which is listening on the port set for the ports referenced by the "primed" Web page. Based on the port on which the incoming request is received at the Resource Router, a resource table 48 lookup is performed to find the "best server" capable of providing the requested object. An HTTP 301 redirection response is returned to the requesting Web client, with the best server returned in the location field of the HTTP header for the redirection response. The Web client program, in response to the 301 redirection response, automatically forwards the request to the server indicated in the location record of the redirection response. The server then responds and supplies the requested object (e.g., a Web page, a database entry, a service, etc.).

Thus, the resource table lookup is used to formulate a redirect response accomplished at a higher level than basic UP routing in that it requires manipulation of the HTTP header (as it is necessary to construct reply headers to the HTTP headers). These reply headers, used for redirection responses, are constructed without parsing the incoming HTTP header. In particular, the reply header is constructed by knowing the requested server object (which is known to the Resource Router based on the port on which the request was received) and the client's address (which is available in the outer layer IP request). For the case of HTTP protocol, the redirection response is accomplished by specifying the "best provider" server in the location field of the response header and then returning the header with a HTTP "301" response code as illustrated in FIG. 6.

If the incoming HTTP request from the client is encrypted, it may be necessary for the Resource Router to encrypt the redirection response, depending on the encryption technology used. This may be a result, for example, of the requesting client expecting an encrypted response. For these cases, the Resource Router can still construct the redirection response without decrypting the incoming request HTTP packet. Again, it is not necessary to know the contents of the request packet, as the pertinent information to the Resource Router is carried in the port number. Encrypting the response may require access to the encrypting keys and certificates used by the client and server, again based on the encryption technology used. But the Resource Router is still saved the considerable processing overhead associated with the decrypting and parsing the incoming request HTTP packet.

Redirectable Routing and Hand Off Mode

For the case of the redirectable protocols, and for the case of the Resource Router operating in handoff mode, the advantage of the redirection is that the Resource Router is removed from the client-server communication path once the redirection is accomplished. This improves the responsiveness of the server, as perceived by the end user at the client. In all cases, selection of the best server based on IP port information saves considerable processing overhead compared to systems that must parse the HTTP packet to determine the object of the request.

Figure 7A:
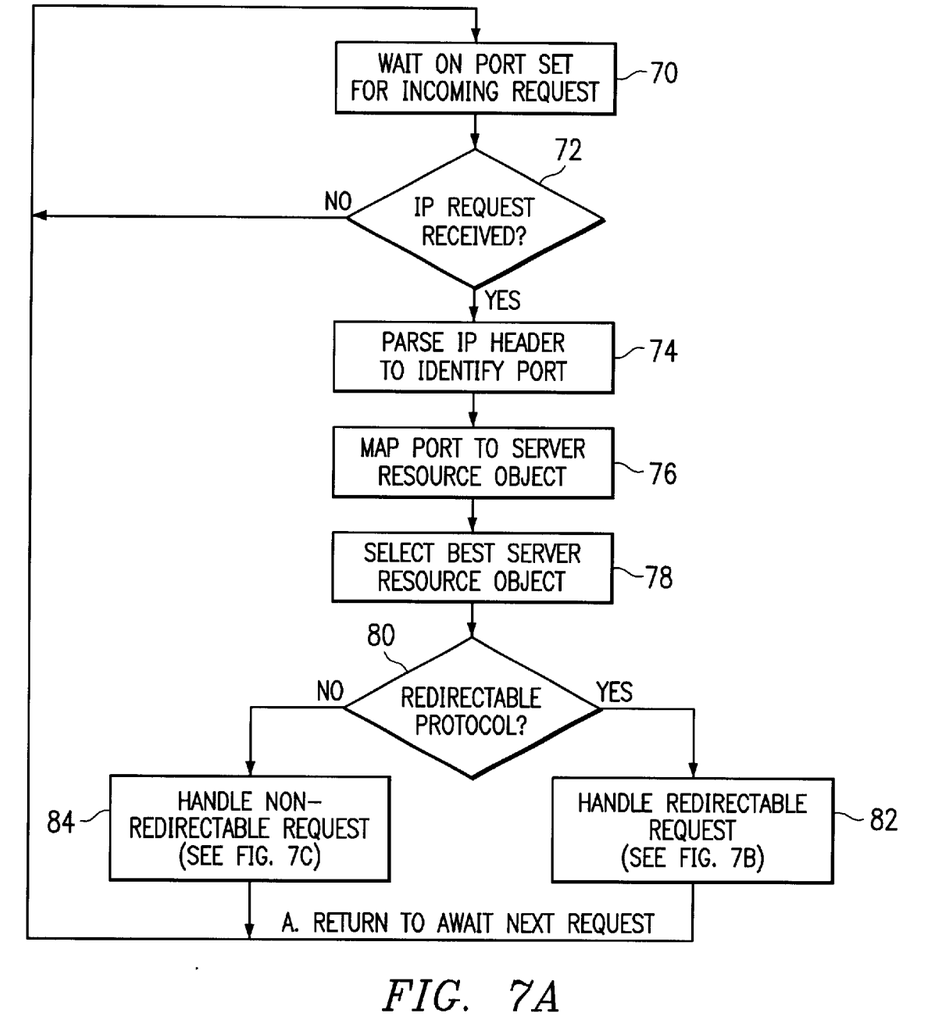
FIGS. 7A–7C are flowcharts describing the operation of the Resource Router in managing routing with both non-redirectable and redirectable protocols according to the present invention.
Figure 7B:
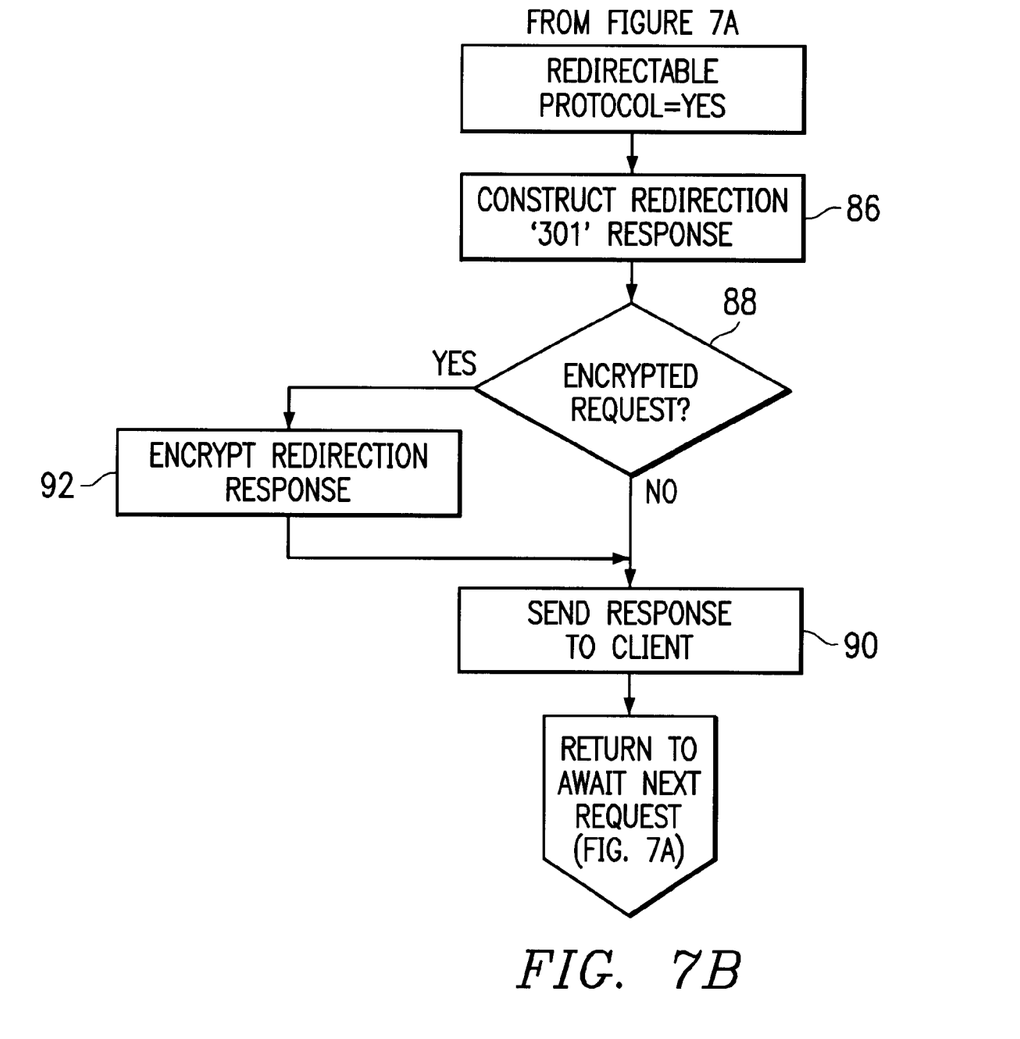
Figure 7C:
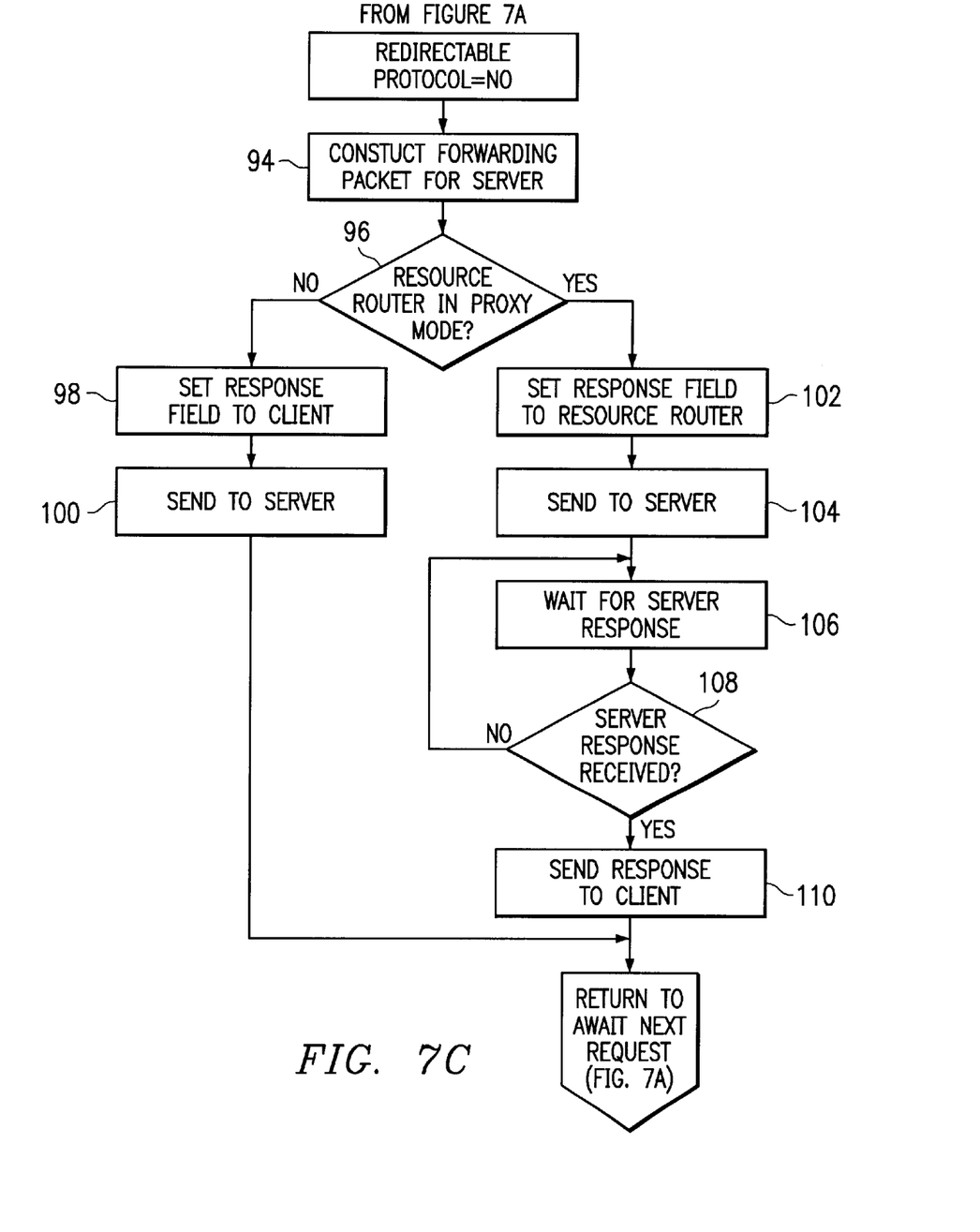

FIGS. 7A–7C are flowcharts that provide a more detailed description of the Resource Router operation. FIG. 7A illustrates the method by which the Resource Router processes an incoming request. The routine begins at step 70 with the Resource Router waiting or "listening" on the port set for the incoming request. There may be a process listening per port or a single multi-threaded process with multiple listener threads assigned to the ports. At step 72, a test is performed to determine whether an IP request has been received. If the outcome of the test at step 72 is negative, the routine cycles back to step 70. If, however, the outcome of the test at step 72 is positive, the routine continues at step 74 to parse the IP header to identify the port number. At step 76, the routine maps the port number to the server resource object. At step 78, the best server for the resource object is selected. A test is then performed at step 80 is determine whether a redirectable protocol is being used. If so, the routine branches to step 82 to handle the redirectable request. This process is described in the flowchart of FIG. 7B. If the outcome of the test at step 80 indicates that a non-redirectable protocol is being used, the routine branches to step 84, which is described in the flowchart of FIG. 7C. Upon return (from either FIG. 7B or 7C), the routine then returns to step 70 to await a next request.

The redirectable protocol handling routine is shown in FIG. 7B and begins at step 86 with construction of the "301" redirection request. At step 88, a test is then done to determine whether the request was encrypted. If not, the routine sends the response to the client machine at step 90. Processing then returns to await a next request. If the outcome of the test at step 88 indicates that the request was encrypted, the routine branches to step 92 to first encrypt the redirection response prior to step 90.

The non-redirectable protocol handling routine is shown in FIG. 7C and begins at step 94 by constructing a forwarding packet for the server. At step 96, a test is performed to determine whether the Resource Router is in proxy mode. If not, the routine branches to the left of the flowchart and continues in step 98 to set the response field to the client. At step 100, the response field is sent to the server, after which the processing returns to await the next request. If, however, the outcome of the test at step 96 indicates that the Resource Router is operating in proxy mode, the routine branches to the right side logic. At step 102, the routine sets the response field to the Resource Router. The response field is then sent to the server at step 104. The routine then continues at step 106 to wait for the server response. A test is performed at step 108 to determine whether a server response has been received. If not, the routine cycles to step 106. If the outcome of the test at step 108 is positive, the response is sent back to the client at step 110, and control then returns to wait for the next client request. This completes the processing.

The present invention provides several important advantages. Parsing and redirecting of HTTP requests is performed based on the server object, and such information is provided to the client in a resource mapping table. The Resource Router maps the IP:port to a resource on a server. This obviates opening up and/or decrypting the TCP/IP packet to determine the requested server object.

In effect, the present invention moves an important piece of routing information (namely, the name of the required server resource) from a higher to a lower level of the TCP/IP protocol. With redirectable protocols are used, this is accomplished (for example) by prepending the port number before the HTTP request in a given TCP/IP packet, and then having the Resource Router use the port number as a lookup into the routing table that holds the server resource location information.

Because the Resource Router has the capability to redirect client requests to various servers, the mapping of server objects to port numbers should be propagated between the various servers. In this manner, all replicated objects on servers have the same port number mapping. Because the servers preferably control the client conversation (i.e. the HTTP requests from the clients are generated by the servers), it is not necessary to propagate the server object/port mapping data to the client.

Care should also be taken in preserving the object to port mapping over time. A utility is preferably provided to do port maintenance to ensure that ports are reclaimed as server resource objects are destroyed. In particular, the Resource Router contains a mechanism for managing the port space so that as server objects are changed (in particular, if server objects are deleted), the port is marked as inactive, representing an invalid request. Alternately, the port is reclaimed and mapped to another server object.

One of ordinary skill will appreciate that the examples set forth above are merely representative. Thus, the invention should not be construed as limited to mapping databases to IP port numbers. The invention is intended to cover mapping any server objects to IP port numbers and exposing them at a lower level of the TCP/IP protocol.

The present invention provides enhanced availability, responsiveness and load balancing for client requests to object access across multiple non-heterogeneous servers. The makes use of standard IP protocols, but exposes identification of the requested server object to a lower level of the protocol.

The present invention is thus highly advantageous in any enterprise or other network computing environment wherein it is desired to provide intelligent routing of requests for server objects while maintaining high performance and end-to-end security characteristics.

Any TCP/IP solution which provides distribution of HTTP requests across multiple servers and requires decision logic to select the server based on the requested server object could potentially use the above-described solution.

As noted above, one of the preferred implementations of the invention is as a set of instructions (program code) in a code module resident in the random access memory or the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, the invention may be used or practiced in any type of Internet Protocol (IP) client, not just within an HTTP-complaint client having a Web browser. Thus, as used herein, references to "browser" should be broadly construed to cover an IP client. Also, as noted above, the "redirectable" protocol is not limited to just HTTP as the inventive technique may be practiced with any such protocol.

Having thus described our invention, what we claim as new and desire to secure by Letters Patent is set forth in the following claims.

We claim:

1. A method of routing in a computer network having a pool of servers capable of servicing requests for access to a set of server resource objects, the method comprising the steps of:

receiving an incoming client request for access to a specified server resource object at a router having an associated port space identifying a plurality of ports, wherein each incoming client request is issued from a client machine having a Web browser, and wherein incoming client requests are targeted to the router by priming a Web page to be displayed on the Web browser to include at least one anchor which references the router, a port number in the port space, and a given server resource object; and based solely on the port on which an incoming client request is received, mapping the incoming client request to one of the server resource objects.

2. The method as described in claim 1 further including the step of selecting a given server from the pool of servers that is capable of serving the server resource object according to some given criteria.

3. The method as described in claim 2 further including the step of forwarding the request to the given server.

4. The method as described in claim 2 further including the step of returning a redirection response to a client machine that initiated the incoming client request, the redirection response specifying the given server.

5. The method as described in claim 4 further including the step of redirecting the redirection response to the given server.

6. The method as described in claim 1 wherein the mapping step uses a mapping table having a plurality of rows, each row including a port number, a server resource object, and a list of servers which are capable of serving the server resource object.

7. The method as described in claim 6 further including the step of marking a port number as inactive if an associated server resource object is unavailable.

8. The method as described in claim 6 further including the step of reclaiming a port number in the mapping table and associating the reclaimed port number with another server resource object.

9. The method of claim 1 wherein the router processes incoming client requests using a proxy/gateway mode, a handoff mode, and a redirection mode.

10. The method of claim 1 further comprising:

determining whether the incoming client request is a redirectable request or a non-redirectable request.

11. The method of claim 1 further comprising:

routing the incoming client request without decrypting contents of the incoming client request.

12. A method of routing in a computer network having a pool of servers capable of servicing requests for access to a set of server resource objects, wherein the set of server resource objects are distributed in a non-homogeneous manner across the server pool, the method comprising the steps of:

receiving each incoming client request for access to a specified server resource object at a router having an associated port space identifying a plurality of ports, wherein the router processes incoming client requests using a proxy/gateway mode, a handoff mode, and a redirection mode;

based solely on the port on which a client request is received, mapping the client request to one of the server resource objects;

selecting a given server from a subset of servers in the pool of servers, wherein each server in the subset of servers is capable of serving the server resource object; and forwarding the client request to the given server.

13. The method as described in claim 12 wherein the given server is selected according to a given criteria.

14. The method as described in claim 12 wherein the mapping step uses a mapping table having a plurality of rows, each row including a port number, a server resource object, and a list of servers which are capable of serving the server resource object.

15. The method as described in claim 14 wherein the port number is a TCP/IP port.

16. The method as described in claim 15 wherein the incoming client request is communicated via an IP protocol.

17. The method of claim 12 further comprising:

determining whether the client request is a redirectable request or a non-redirectable request.

18. The method of claim 12 further comprising:

routing the client request without decrypting contents of the client request.

19. A method of routing in a computer network having a pool of servers capable of servicing requests for access to a set of server resource objects, wherein the set of server resource objects are distributed in a non-homogeneous manner across the server pool, the method comprising the steps of:

receiving each incoming client request for access to a specified server resource object at a router having an associated port space identifying a plurality of ports;

based solely on the port on which a client request is received, mapping the client request to one of the server resource objects;

selecting a given server from a subset of servers in the pool of servers, wherein each server in the subset of servers is capable of serving the server resource object; and returning a redirection response to a client machine that initiated the client request, the redirection response specifying the given server.

20. The method as described in claim 19 further including the step of redirecting the redirection response to the given server.

21. The method as described in claim 19 wherein the given server is selected according to a given criteria.

22. The method as described in claim 19 wherein the mapping step uses a mapping table having a plurality of rows, each row including a port number, a server resource object, and a list of servers which are capable of serving the server resource object.

23. The method as described in claim 22 wherein the port number is a TCP/IP port.

24. The method as described in claim 23 wherein the incoming client request is communicated via an HTTP protocol.

25. The method of claim 19 wherein the router processes incoming client requests using a proxy/gateway mode, a handoff mode, and redirection mode.

26. The method of claim 19 further comprising:

determining whether the client request is a redirectable request or a non-redirectable request.

27. The method of claim 19 further comprising:
routing the client request without decrypting contents of the client request.

28. A computer program product in a computer readable medium for controlling routing of client requests in a computer network, the computer network having a pool of servers capable of servicing requests for access to a set of server resource objects, the computer program product comprising:
means for maintaining a mapping table having a plurality of rows, each row including the port number, a server resource object, and a list of servers which are capable of serving the server resource object;
means responsive to an incoming client request for access to a specified server resource object for mapping the request, based solely on the port on which the incoming client request is received, to one of the server resource objects using the mapping table in a router; and
means for returning a redirection response to a client machine that initiated the incoming client request, the redirection response specifying the given server.

29. The computer program product as described in claim 28 further including means for selecting a given server from the pool of servers that is capable of serving the server resource object according to some given criteria.

30. The computer program product as described in claim 29 further including means for forwarding the request to the given server.

31. The computer program product of claim 28 further comprising:
means for processing incoming client requests using a proxy/gateway mode, a handoff mode, and a redirection mode.

32. The computer program product of claim 28 further comprising:
means for determining whether the client request is a redirectable request or a non-redirectable request.

33. The computer program product of claim 28 further comprising:
means for routing the client request without decrypting contents of the client request.

34. A computer, comprising:
a processor;
an operating system;
a router for controlling routing of client requests in a computer network, the computer network having a pool of servers capable of servicing requests for access to a set of server resource objects, comprising:
means for maintaining a mapping table having a plurality of rows, each row including a port number, a server resource object, and a list of servers which are capable of serving the server resource object;
means responsive to an incoming client request for access to a specified server resource object for mapping the request, based solely on the port on which the incoming client request is received, to one of the server resource objects using the mapping table; and
means for returning a redirection response to a client machine that initiated the incoming client request, the redirection response specifying the given server.

35. The computer as described in claim 34 wherein the router further includes means for selecting a given server from the pool of servers that is capable of serving the server resource object according to some given criteria.

36. The computer as described in claim 35 wherein the router further includes means for forwarding the request to the given server.

37. The computer of claim 34 wherein the router further comprises:
means for processing incoming client requests using a proxy/gateway mode, a handoff mode, and a redirection mode.

38. The computer of claim 34 further comprising:
means for determining whether the client request is a redirectable request or a non-redirectable request.

39. The computer of claim 34 further comprising:
means for routing the client request without decrypting contents of the client request.

40. A method of routing in a computer network having a requesting Web client connectable through a router to a pool of servers capable of servicing requests for access to a set of server resource objects, the method comprising the steps of:
in response to activation of an anchor in a Web page of the form <servername>:<port number>, where <servername> is an IP address for the router and <port number> is a TCP/IP port number in a port space at the router, receiving a client request at the router;
mapping the port number to one of the server resource objects based solely on the port on which the client request is received;
selecting a best server from a subset of servers in the pool of servers, wherein each server in the subset of servers is capable of providing the server resource object identified by the mapping step; and
returning a redirection response to the requesting Web client with the best server returned in a location field of an HTTP header for the redirection response.

41. The method of claim 40 wherein the router processes incoming client requests using a proxy/gateway mode, a handoff mode, and a redirection mode.

42. The method of claim 40 further comprising:
determining whether the client request is a redirectable request or a non-redirectable request.

43. The method of claim 40 further comprising:
routing the client request without decrypting contents of the client request.

* * * * *

UNITED STATES PATENT AND TRADEMARK OFFICE
CERTIFICATE OF CORRECTION

PATENT NO. : 6,360,262 B1
DATED : March 19, 2002
INVENTOR(S) : Guenthner et al.

It is certified that error appears in the above-identified patent and that said Letters Patent is hereby corrected as shown below:

Column 6,
Line 21, "UP" should read -- IP --.

Signed and Sealed this

Twenty-third Day of July, 2002

Attest:

Attesting Officer

JAMES E. ROGAN
*Director of the United States Patent and Trademark Office*